US010586155B2

(12) United States Patent
Cook et al.

(10) Patent No.: US 10,586,155 B2
(45) Date of Patent: *Mar. 10, 2020

(54) CLARIFICATION OF SUBMITTED QUESTIONS IN A QUESTION AND ANSWER SYSTEM

(71) Applicant: International Business Machines Corporation, Armonk, NY (US)

(72) Inventors: Kelly L. Cook, Raleigh, NC (US); Adrian X. Rodriguez, Durham, NC (US); Michael M. Skeen, Raleigh, NC (US); Eric Woods, Durham, NC (US); Menlo Wuu, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/658,395

(22) Filed: Jul. 25, 2017

(65) Prior Publication Data

US 2017/0330084 A1    Nov. 16, 2017

Related U.S. Application Data

(63) Continuation of application No. 15/143,771, filed on May 2, 2016, now Pat. No. 9,721,205, which is a
(Continued)

(51) Int. Cl.
*G06F 17/00* (2019.01)
*G06N 5/02* (2006.01)
(Continued)

(52) U.S. Cl.
CPC ............ *G06N 5/02* (2013.01); *G06F 3/04842* (2013.01); *G06F 16/24575* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| 5,836,771 A | 11/1998 | Ho et al. |
| RE38,432 E | 2/2004 | Fai et al. |

(Continued)

FOREIGN PATENT DOCUMENTS

WO    WO 02009/021198 A1    2/2009

OTHER PUBLICATIONS

Garcia-Serrano et al, "Using AI Techniques to Support Advanced Interaction Capabilities in a Virtual Assistant for E-Commerce", 2004, Experts Systems with Applications, vol. 26, pp. 413-426. (Year: 2004).*

(Continued)

*Primary Examiner* — Paulinho E Smith
(74) *Attorney, Agent, or Firm* — Stephen J. Walder, Jr.; Reza Sarbakhsh (57) ABSTRACT

Mechanisms for clarifying an input question are provided. A question is received for generation of an answer. A set of candidate answers is generated based on an analysis of a corpus of information. Each candidate answer has an evidence passage supporting the candidate answer. Based on the set of candidate answers, a determination is made as to whether clarification of the question is required. In response to a determination that clarification of the question is required, a request is sent for user input to clarify the question. User input is received from the computing device in response to the request and at least one candidate answer in the set of candidate answers is selected as an answer for the question based on the user input.

20 Claims, 5 Drawing Sheets

Related U.S. Application Data continuation of application No. 13/957,128, filed on Aug. 1, 2013, now Pat. No. 9,342,608.

(51) Int. Cl.
  *G06F 16/9535* (2019.01)
  *G06F 16/2457* (2019.01)
  *G06F 3/0484* (2013.01)

(56) References Cited

U.S. PATENT DOCUMENTS

| | | | |
|---|---|---|---|
| 7,058,567 | B2 | 6/2006 | Ait-Mokhtar et al. |
| 7,519,529 | B1 | 4/2009 | Horvitz |
| 7,711,672 | B2 | 5/2010 | Au |
| 7,720,674 | B2 | 5/2010 | Kaiser et al. |
| 7,849,048 | B2 | 12/2010 | Langseth et al. |
| 7,962,470 | B2 | 6/2011 | Degenkolb et al. |
| 8,156,101 | B2 | 4/2012 | Indeck et al. |
| 8,161,073 | B2 | 4/2012 | Connor |
| 8,209,315 | B2 | 6/2012 | Alshawi |
| 9,047,567 | B2 * | 6/2015 | Barborak ............... G09B 7/04 |
| 9,342,608 | B2 | 5/2016 | Cook et al. |
| 9,361,386 | B2 | 6/2016 | Cook et al. |
| 2002/0032740 | A1 | 3/2002 | Stern et al. |
| 2004/0110120 | A1 | 6/2004 | Ho et al. |
| 2005/0165607 | A1 | 7/2005 | Di Fabbrizio et al. |
| 2005/0289124 | A1 | 12/2005 | Kaiser et al. |
| 2006/0053133 | A1 | 3/2006 | Parkinson |
| 2006/0100855 | A1 | 5/2006 | Rozen |
| 2006/0235689 | A1 | 10/2006 | Sugihara et al. |
| 2007/0078842 | A1 | 4/2007 | Zola et al. |
| 2007/0203893 | A1 | 8/2007 | Krinsky et al. |
| 2008/0270142 | A1 | 10/2008 | Srinivasan et al. |
| 2009/0162824 | A1 | 6/2009 | Heck |
| 2009/0287678 | A1 | 11/2009 | Brown et al. |
| 2009/0292687 | A1 | 11/2009 | Fan et al. |
| 2010/0070360 | A1 | 3/2010 | Gilbert et al. |
| 2011/0060584 | A1 | 3/2011 | Ferrucci et al. |
| 2011/0066587 | A1 | 3/2011 | Ferrucci et al. |
| 2011/0087656 | A1 | 4/2011 | Oh et al. |
| 2011/0125734 | A1 | 5/2011 | Duboue et al. |
| 2011/0270607 | A1 | 11/2011 | Zuev |
| 2012/0041950 | A1 | 2/2012 | Koll et al. |
| 2013/0007055 | A1 | 1/2013 | Brown et al. |
| 2013/0017523 | A1 | 1/2013 | Barborak et al. |
| 2013/0017524 | A1 * | 1/2013 | Barborak ............... G09B 7/04 434/322 |
| 2013/0018652 | A1 | 1/2013 | Ferrucci et al. |
| 2013/0066886 | A1 | 3/2013 | Bagchi et al. |
| 2013/0218914 | A1 | 8/2013 | Stavrianou et al. |
| 2014/0046947 | A1 | 2/2014 | Jenkins et al. |
| 2014/0120513 | A1 | 5/2014 | Jenkins et al. |
| 2015/0039536 | A1 | 2/2015 | Cook et al. |
| 2015/0058329 | A1 | 2/2015 | Cook et al. |
| 2015/0106367 | A1 | 4/2015 | Cook et al. |
| 2016/0314393 | A1 | 10/2016 | Cook et al. |

OTHER PUBLICATIONS

Corville O. Allen et al., "Natural Language Access to Application Programming Interfaces", filed Dec. 17, 2013, U.S. Appl. No. 14/109,527.
U.S. Appl. No. 13/957,128, 3 pages.
U.S. Appl. No. 14/492,463, 3 pages.
U.S. Appl. No. 15/143,771, 3 pages.
"DeepQA Project FAQ's", IBMResearch, Retrieved on Sep. 13, 2011 from http://www.research.ibm.com/deepqa/faq.shtml, 6 pages.
"IBM System Blue Gene/P Solution", Facilitating Extreme Scalability, IBM, 2007, 2 pages.
"Smith-Waterman algorithm", Wikipedia, retrieved from http://en.wikipedia.org/wiki/Smith-Waterman_algorithm on Feb. 5, 2013, 6 pages.
"Stack Overflow, HTTP Request signature without session", Retrieved on Dec. 10, 2013 from http://stackoverflow.com/questions/4513335, 3 pages.
Ait-Mokhtar, S et al., "Robustness beyond Shallowness: Incremental Deep Parsing", Natural Language Engineering, 8 (2/3): pp. 121-144, 2002 Cambridge University Press, Retrieved on Aug. 28, 2013 from http://pageperso.lif. univ-mrs.fr/~edouard.thiel/RESP/Semi/2006/ROUX/idp.pdf, pp. 1-24.
Al-Harbi, Omar et al., "Lexical Disambiguation in Natural Language Questions (NLQs)", IJCSI International Journal of Computer Science Issues, vol. 8, Issue 4, No. 2, Jul. 2011, pp. 143-150.
Allen, James F. et al., "Deep Semantic Analysis of Text", Retrieved on Oct. 27, 2012 from http://aclweb.org/anthology-new/W/W08/W08-2227.pdf, pp. 343-354.
Budnik, Tom et al., "High Throughput Computing on IBM's Blue Gene/P", IBM Rochester Blue Gene Development, White Paper, May 5, 2008, pp. 1-18.
Cavage, M et al., "HTTP Signatures, draft-cavage-http-signatures-00", Draft IETF document, Nov. 5, 2013, pp. 1-10.
Declerk, Thierry et al., "Linguistic and Semantic Representation of the Thompson's Motif-Index of Folk-Literature", Retrieved on Aug. 28, 2013 from http://link.springer.com/chapter/10.1007/978-3-642-24469-8_17, 4 pages.
Ferrucci, David et al., "Building Watson: An Overview of the DeepQA Project", Retrieved on Nov. 11, 2011 from http://www.stanford.edu/class/cs124/AIMagzine-DeepQA.pdf, Association for the Advancement of Artificial Intelligence, Fall 2010, pp. 59-79.
Garcia-Serrano, Ana M. et al., "Using AI techniques to support advanced interaction capabilities in a virtual assistant for e-commerce", Elsevier Ltd., Expert Systems with Applications, vol. 26, Issue 3, Apr. 2004, pp. 413-426.
High, Rob, "The Era of Cognitive Systems: An Inside Look at IBM Watson and How it Works", IBM Corporation, Redbooks, Dec. 12, 2012, 16 pages.
Jenkins, Jana H. et al., "Content Revision Using Question and Answer Generation", U.S. Appl. No. 13/570,536, filed Aug. 9, 2012.
Jenkins, Jana H. et al., "Question and Answer System Providing Indications of Information Gaps", U.S. Appl. No. 13/660,711, filed Oct. 25, 2012.
Jeon, Jiwoon, "Finding Similar Questions in Large Question and Answer Archives", University of Massachusetts—Amherst, Computer Science Department Faculty Publication Series, Paper 138, 2005, 8 pages.
Maggiani, Rich, "Method for Customizing Queries Based on User Preferences for Searching Online Content and Returning Customized Results", IP.com, IPCOM000179234D, Feb. 10, 2009, 7 pages.
Mccarty, L. Thorne, "Deep Semantic Interpretations of Legal Texts", Retrieved on Nov. 27, 2012 from http://remus.rutgers.edu/cs440/icail07-acm.pdf, ICAIL '07, Jun. 4-8, 2007, ACM, 9 pages.
Mccord, M.C. et al., "Deep parsing in Watson", IBM J. Res. & Dev. vol. 56 No. 3/4 Paper 3, May/Jul. 2012, pp. 3:1-3:15.
Pradhan, Sameer S. et al., "Building a Foundation System for Producing Short Answers to Factual Questions", NIST Special Publication, Information Technology, No. 500-251, 2012, 10 pages.
Shim, Bojun et al., "Extracting and Utilizing of IS-A Relation Patterns for Question Answering Systems", Information Retrieval Technology, Second Asia Information Retrieval Symposium (AIRS 2005), Lecture Notes in Computer Science (LNCS vol. 3689, 2005, pp. 697-702.
Sun, Renxu et al., "Dependency Relation Matching for Answer Selection", Proceedings of the Twenty-Eighth Annual International ACM SIGIR Conference on Research and Development in Information Retrieval (SIGIR 2005), Aug. 15-19, 2005, 2 pages.
Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

ORIGINAL QUESTION: WHO WAS THE FIRST PRESIDENT?

THE FIRST PRESIDENT OF WHAT? (SELECT ONE)

1) UNITED STATES ☒

2) SOUTHERN BAPTIST CONVENTION ☐

*FIG. 4A*

ORIGINAL QUESTION: WHO WAS THE FIRST PRESIDENT?

THE FIRST PRESIDENT OF WHAT?

| UNITED STATES OF AMERICA |

*FIG. 4B*

ORIGINAL QUESTION: WHO WAS THE FIRST PRESIDENT?

PRESIDENT OF THE UNITED STATES?

YES ☒   NO ☐

CLARIFICATION OF SUBMITTED QUESTIONS IN A QUESTION AND ANSWER SYSTEM

This application is a continuation of application Ser. No. 15/143,771, filed May 2, 2016, status awaiting publication, which is a continuation of application Ser. No. 13/957,128, filed Aug. 1, 2013, issued as U.S. Pat. No. 9,342,608.

BACKGROUND

The present application relates generally to an improved data processing apparatus and method and more specifically to mechanisms for identifying unique criteria for clarifying a submitted question in a question and answer (QA) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for clarifying an input question. The method comprises receiving, in the data processing system from a computing device, the input question for generation of an answer to the input question. The method further comprises generating, in the data processing system, a set of candidate answers for the input question based on an analysis of a corpus of information, wherein each candidate answer in the set of candidate answers has an evidence passage supporting the candidate answer as answering the input question. Moreover, the method comprises determining, in the data processing system, based on the set of candidate answers, whether clarification of the input question is required and sending, by the data processing system, in response to a determination that clarification of the input question is required, a request for user input to clarify the input question. In addition, the method comprises receiving, in the data processing system, user input from the computing device in response to the request and selecting, by the data processing system, at least one candidate answer in the set of candidate answers as an answer for the input question based on the user input.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for identifying unique criteria for clarifying a submitted question in a question and answer (QA) system. That is, in a QA system, a user submits a question in a natural language form, i.e. unstructured form, to the QA system which searches a corpus of information to identify one or more candidate answers to the submitted question from evidence passages in the corpus of information. However, users often submit questions with multiple "correct" answers based on the context given in the submitted question. In other words, a user submitted question often contains implied context that is intuitive to humans but is not intuitive to algorithmic QA systems.

For example, consider the question "Who was the first president?" There are many "first presidents" of different nations, corporations, or any other organization. The first president to die in office, as well as many other first presidents for various other contexts, may also be a valid answer to this submitted question as well since the QA system cannot determine from the question itself the implied context.

Assume that the QA system has the following two evidence passages that are analyzed as part of the search of the corpus of information based on the analysis of the submitted question:

"The historian Bartolome Mitre stated that Manuel Belgrano held a deep admiration for George Washington, leader of the American Revolution and first President of the United States. Because of it, he worked in the translation of George Washington's Farewell Address into the Spanish language."

"William Bullein Johnson (A.M. 1814)—South Carolina Baptist leader and first president of the Southern Baptist Convention. Associate of first president of Columbian College (later The George Washington University) William Staughton and Luther Rice."

From these evidence passages, the QA system may form two hypotheses that "George Washington" and "William Johnson" are candidate answers for the submitted question. However, the question cannot be answered with confidence without additional context in the submitted question to specify the president of what. Known QA systems do not have a viable mechanism for clarifying unstructured questions with multiple candidate answers.

The illustrative embodiments provide mechanisms for disambiguating user submitted questions in a QA system which have multiple "correct" candidate answers, i.e. candidate answers having a threshold level of confidence indicative of the candidate answer being potentially correct for the submitted question. With the mechanisms of the illustrative embodiments, the QA system is augmented to include logic for determining differentiating facts, concepts, or semantic relationships (referred to herein collectively as "differentiating factors") in the evidence passages leading to the identification of potentially "correct" candidate answers. The logic of the QA system then interactively communicates with the user that submitted the originally submitted question based on the identified differentiating facts, concepts, or semantic relationships to further identify the implied context of the originally submitted question. In so doing, the user interactively clarifies their originally submitted question to thereby enable the QA system to identify which of the potentially "correct" candidate answers is considered to be the most likely correct answer for the originally submitted question.

Based on the user's input to the interactive communications for clarifying the implied context of the originally submitted question, weights associated with confidence scores, or components of confidence scores, may be adjusted to increase/decrease these confidence scores or components to increase or improve the scores associated with the implied context of the originally submitted question and reduce or lessen the scores that are not associated with the implied context of the originally submitted question. In some cases, candidate answers as a whole may be eliminated from consideration if their evidence passages indicate that the evidence is for a different context from that of the implied context of the originally submitted question as clarified through the interactive communications with the user.

Once the implied context of the input question is further clarified through the interactive communications, and the candidate answers are modified based on the user input clarifying the implied context, the QA system may generate a final ranked listing of candidate answers and/or a final answer for the originally submitted question. The ranked listing and/or final answer may be returned to the submitter of the originally submitted question. Confidence scores, evidence passage information, and the like, may be returned with the ranked listing and/or final answer as well.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
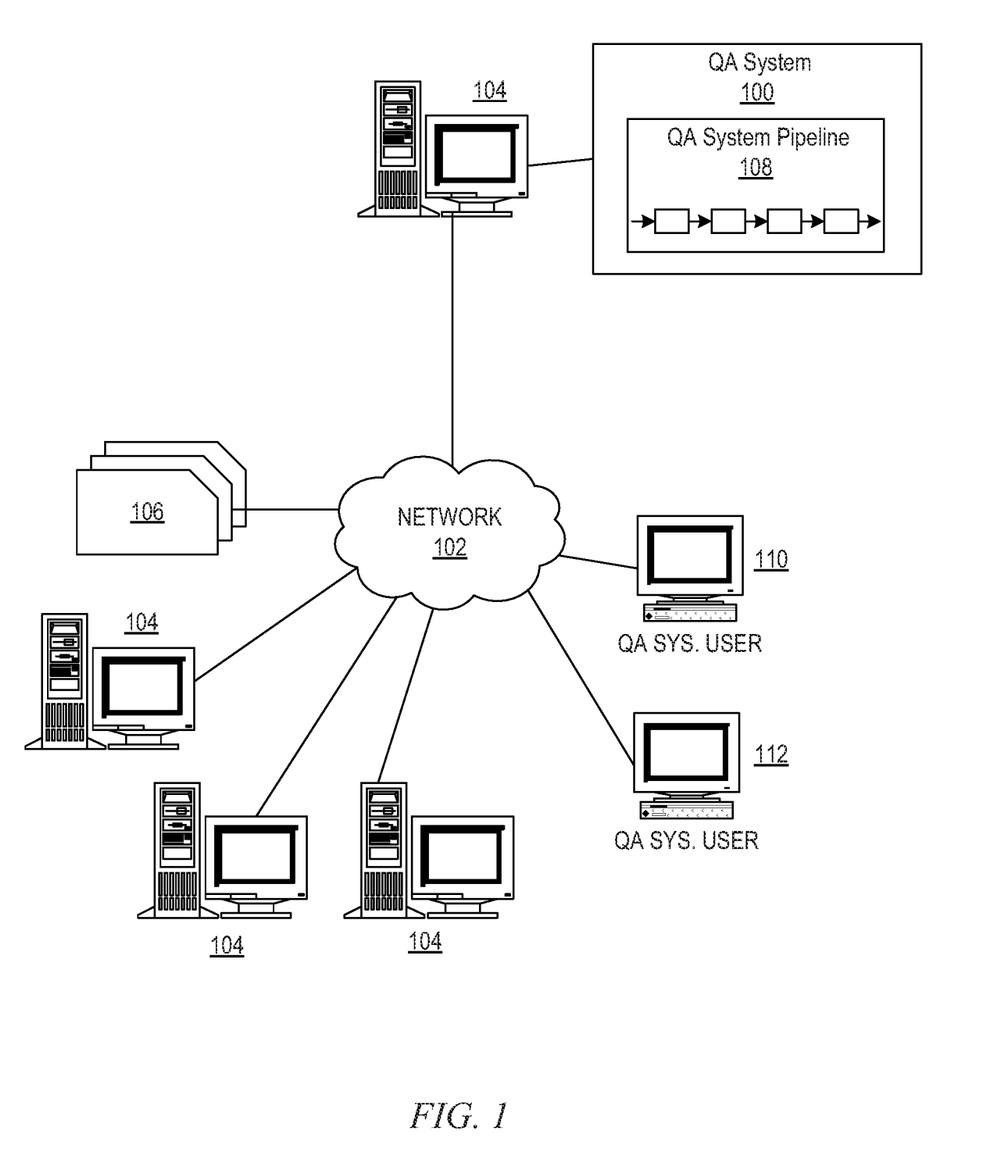
FIG. 1 depicts a schematic diagram of one illustrative embodiment of a question and answer (QA) system in a computer network.
Figure 2:
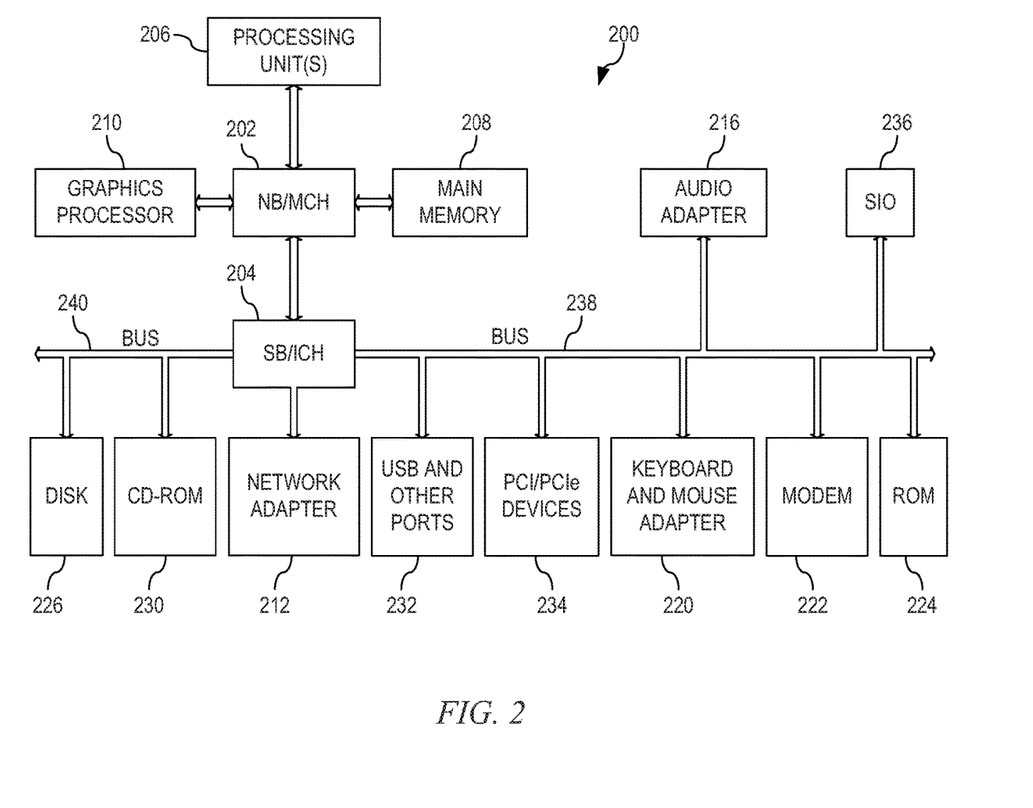
FIG. 2 is a block diagram of an example data processing system in which aspects of the illustrative embodiments may be implemented.
Figure 3:
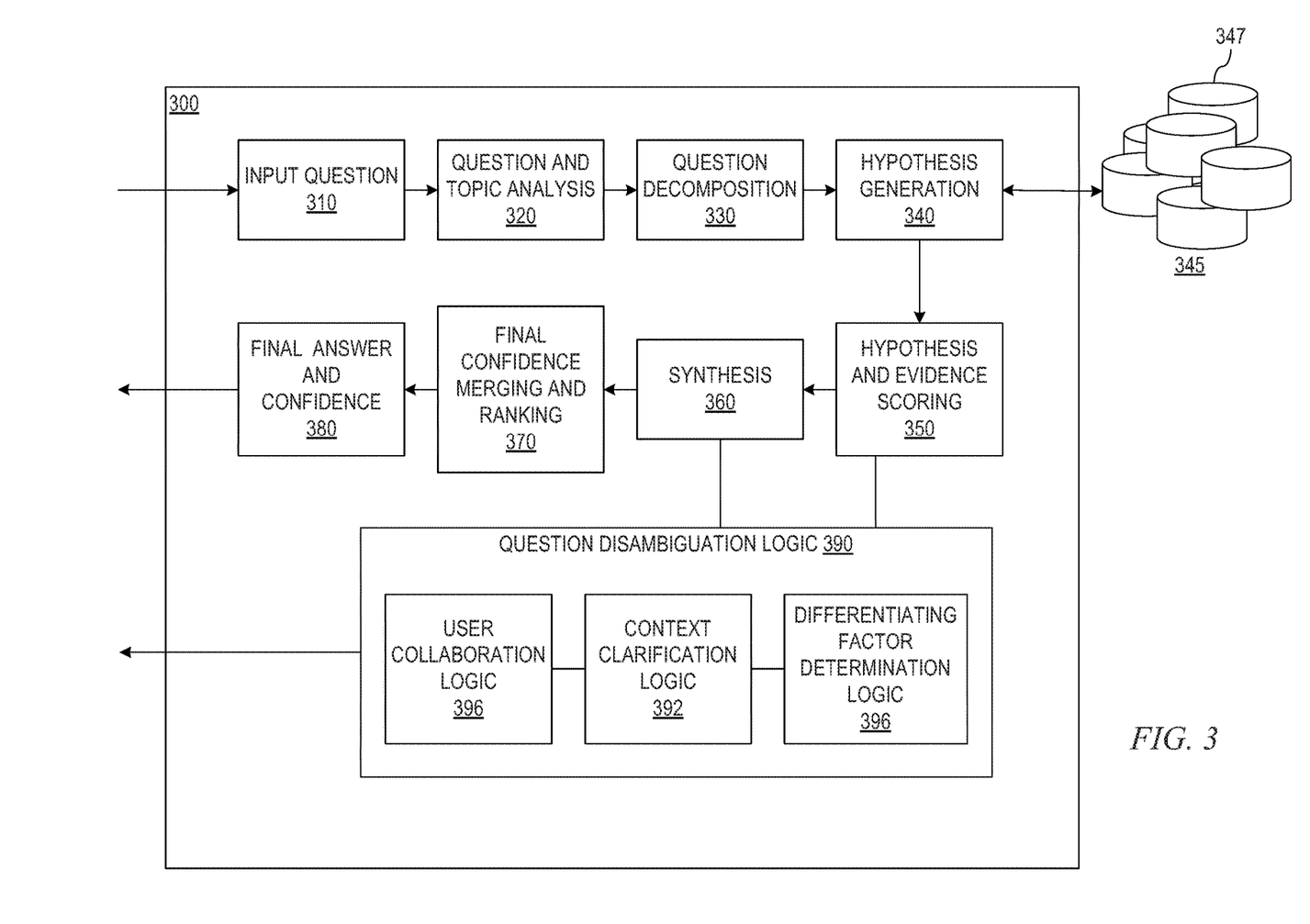
FIG. 3 illustrates a QA system pipeline for processing an input question in accordance with one illustrative embodiment.

Thus, the illustrative embodiments may be utilized in many different types of data processing environments. FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to clarifying the context of submitted questions through an interactive communication with a user so as to increase the accuracy of the answering of submitted questions where the context of the submitted question is ambiguous. Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be implemented, for example, in one or more of the stages to implement the improved mechanism of the illustrative embodiments described hereafter.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who were Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpus of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information 345. That is, these various sources themselves, collections of sources, and the like, may represent different corpora 347 within the corpus 345. There may be different corpora 347 defined for different collections of documents based on various criteria depending upon the particular implementation. For example, different corpora may be established for different topics, subject matter categories, sources of information, or the like. As one example, a first corpora may be associated with healthcare documents while a second corpora may be associated with financial documents. Alternatively, one corpora may be documents published by the U.S. Department of Energy while another corpora may be IBM Redbooks documents. Any collection of content having some similar attribute may be considered to be a corpora 347 within the corpus 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed, such as to extract particular features within the portions of the corpus, and used, during the hypothesis generation stage 540, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, in accordance the illustrative embodiments question disambiguation logic 390 is provided for interfacing with the hypothesis and evidence scoring stage 350 logic and the synthesis stage 360 logic to determine whether disambiguation of the input question 310 is needed and, if so, to perform operations for identifying differentiating factors in the evidence passages leading to the candidate answers and interacting with a user that submitted the input question 310 to obtain user input for clarifying the context of the input question 310 based on the identified differentiating factors.

As shown in FIG. 3, the question disambiguation logic 390 comprises context clarification logic 392, differentiating factor determination logic 394, and user collaboration logic 396. The context clarification logic 392 analyzes the set of candidate answers to determine if there are multiple "correct" candidate answers identified from the corpus of information. The determination of whether there are multiple "correct" candidate answers may be as simple as determining if a more than one candidate answer generated by the hypothesis generation stage 340 and scored by the hypothesis and evidence scoring stage 350 has a confidence score equal to or exceeding a predetermined threshold confidence score, indicating that the candidate answer is likely a correct answer for the input question 310. Alternatively, a determination may be used in which a determination is made as to whether a highest scoring candidate answer, of a plurality of candidate answers, has a confidence score equal to or higher than a predetermined threshold, in which case it is returned as the correct answer for the input question 310, and if not, then multiple "correct" candidate answers are determined to be present.

In yet another possible embodiment, the determination may be more complex and involve multiple determinations, comparisons with a plurality of threshold values, and the like. For example, in one illustrative embodiment, a first determination may be made to determine if any of the candidate answers have a corresponding confidence score above a first threshold indicating that the candidate answer is highly likely to be the correct answer for the input question 310, e.g., a confidence score of 90% confidence or higher. If more than one candidate answer has a confidence score equal to or higher than this first threshold, then a determination is made that there are multiple "correct" candidate answers for the input question 310. If only one candidate answer has a confidence score equal to or higher than this first threshold, then a determination may be made that the candidate answer having the confidence score equal to or higher than the first threshold is the correct answer for the input question 310 and may be returned as the correct answer to the submitter of the input question 310. Alternatively, if multiple candidate answers have confidence scores equal to or above this first threshold, all of the candidate answers having confidence scores equal to or above this first threshold may be returned as correct answers for the input question 310, or a candidate answer having the highest confidence score may be selected from amongst these candidate answers whose confidence scores are equal to or above this first threshold. Thus, the first threshold defines a demarcation line where some candidate answers are determined to be correct answers for the input question (those whose confidence scores are equal to or above the first threshold) and other candidate answers are either not correct answers to the input question 310 or are potentially correct candidate answers for the input question 310 but further clarification of the context of the input question 310 may be required.

If none of the candidate answers are determined to have confidence scores equal to or above this first threshold, a second determination may be made as to whether a plurality of candidate answers have confidence scores above a second threshold, e.g., a confidence score of 60% confidence or higher. If more than one candidate answer has a confidence score equal to or higher than this second threshold, then it may be determined that there are multiple "correct" candidate answers for the input question 310 and other candidate answers having confidence scores less than the second threshold may be discarded. This second threshold, along with the first threshold, essentially defines a range of confidence scores where candidate answers are potentially correct answers for the input question 310. If multiple candidate answers fall within this range of confidence scores, then further clarification of the context of the input question 310 may be requested to ascertain which, if any, of the candidate answers is a correct answer for the input question 310. Any number of determinations, comparisons, threshold values, and the like, may be used without departing from the spirit and scope of the present invention.

In response to the context clarification logic 392 determining that there are multiple "correct" candidate answers, the context clarification logic 392 instructs the differentiating factor determination logic 394 to analyze the evidence passages used to generate each of the multiple "correct" candidate answers to identify differentiating factors, e.g., facts, concepts, or semantic relationships, in the various evidence passages that differentiate one "correct" candidate answer from one or more of the other "correct" candidate answers. The differentiating factor determination logic 394 may interface with the hypothesis and evidence scoring stage 350 logic to analyze the features of the evidence passages to identify the features indicative of differentiating factors leading to the generation of the candidate answers. Thus, the differentiating factor determination logic 394 may compare similar types of features from the evidence passages, identify features of similar type that have different content, and then identify those features as being differentiating factors.

The differentiating factors essentially identify a difference in the context of the evidence passages that support the candidate answers. That is, using the example previously set forth above, the following two evidence passages may be analyzed to extract various features by the hypothesis generation stage 340 logic and scored by the hypothesis and evidence scoring stage 350 logic:

"The historian Bartolome Mitre stated that Manuel Belgrano held a deep admiration for George Washington, leader of the American Revolution and first President of the United States. Because of it, he worked in the translation of George Washington's Farewell Address into the Spanish language."

"William Bullein Johnson (A.M. 1814)—South Carolina Baptist leader and first president of the Southern Baptist Convention. Associate of first president of Columbian College (later The George Washington University) William Staughton and Luther Rice."

The extraction of features may be done using any suitable type of natural language processing (NLP) analysis or the like. The extraction of features may take many different forms and may look at many different types of features within the evidence passages including a topic of the evidence passage, parts of speech of the portions of the evidence passages, domain specific analysis, keyword or key phrase identification, and the like. The extraction of features may be done specifically for the particular input question 310 based on the identification of the type of answer that the input question 310 is requesting. That is, through the analysis of the input question 310 by the question and topic analysis stage 320 logic and the question decomposition stage 330 logic, it may be determined that the input question 310 "Who was the first president?" is looking for a name of a person and specifically the name of a first president. In extracting features from the evidence passages to identify differentiating factors, the extraction may be with regard to features specifically directed to clarifying the context of the name of a particular person and a particular type of first president. In the above example, such features include "of the United States" and "of the Southern Baptist Convention." Thus, the differentiating factors that are determined to exist between the two evidence passages include the focus of the term "president" being the "United States" and the "Southern Baptist Convention" in the corresponding evidence passages.

There may be multiple extracted features from the evidence passages that are evaluated by the differentiating factor determination logic 394 to identify those extracted features that are indicative of a context of the candidate answer within the evidence passage and which have differences that may differentiate one candidate answer from another. Thus, there may be multiple types of extracted features for which the evidence passages have differing content. For example, if an extracted feature is a focus of the term "president", then the two example passages above have different focuses of the "United States" and "Southern Baptist Convention." Other types of extracted features may also be identified in the evidence passages as well. Thus, with the mechanisms of the illustrative embodiments, differentiating factors that are specific to differentiating the candidate answers, and specific to the focus of the input question 310, may be identified.

Based on the identification of the differentiating factors between the evidence passages supporting the various candidate answers, the context clarification logic 392 may forward the differentiating factors, the feature types, and the like, to the user collaboration logic 396 for use in obtaining user input to clarify the implied context of the input question 310. That is, the context clarification logic 392 formulates one or more user interfaces for requesting user feedback input that further clarifies the implied context of the input question 310. The user interfaces may present one or more questions and fields or other user interface elements for receiving from a user input indicating a clarification of the implied context of the input question 310.

For example, based on the analysis of the focus of the input question 310 and the differentiating factors of the evidence passage, one or more clarification questions may be generated requesting clarification of the focus of the input question 310 and presenting the user with a free-form input field, list of potential answers to the one or more clarification questions, fields for answering yes/no to the one or more clarification questions, or the like. The user interfaces may be output to the computing device that submitted the input question 310 so that the user interfaces are output to the user via the computing device. The user may submit user input to the user interfaces which may then be returned by the computing device to the QA system pipeline 300 for use by the user collaboration logic 396. The user input may be used to further clarify the implied context of the input question 310 and adjust the scoring of candidate answers (hypothesis), eliminate candidate answers altogether, or the like.

For example, from the evidence passages in the example above, the QA system may form two hypotheses that "George Washington" and "William Johnson" are candidate answers for the submitted question. However, the question cannot be answered with confidence without additional context in the submitted question to specify the president of what. From an analysis of the input question 310, it can be determined that the focus of the input question 310 is the president of something and the analysis of the candidate answers and evidence passages indicate that the candidate answers are names of presidents of something and that these "somethings" are the differentiating factors between the candidate answers, e.g., the United States and the Southern Baptist Convention.

Thus, a user interface may be generated with a clarification question to be presented to the user requesting that the user specify the president "of what?" The user interface may include a free-form text field into which the user may answer the clarification question in a free-form manner with the user's input text being analyzed and compared against the differentiating factors to select one of the differentiating factors as being indicative of the implied context of the input question 310. Alternatively, the user interface may present the differentiating factors that may answer the clarification question in a multiple choice manner with corresponding selection user interface elements that allow a user to select one or more of the differentiating factors as an answer to the clarification questions.

In still a further embodiment, the clarification questions may be presented in a "yes/no" format in which the differentiating factors are part of the clarification question. An example of such a clarification question may be of the type "Do you want the first president of the United States? Yes/No". The user may select a "Yes" or "No" user interface element to respond to the clarification question. A series of such questions may be presented in the user interface, or a series of user interfaces, until a "Yes" answer is returned by the user. In this way, the various different implied contexts may be explored allowing the user to specify which implied context applies to the input question 310.

The user input into the user interface(s) is returned to the QA system pipeline 300 and received by the user collaboration logic 396 which informs the context clarification logic 392 of the user's identification of the correct differentiating factor indicative of the implied context of the input question 310. The user input may be used by the context clarification logic 392 to instruct the synthesis stage 360 logic and/or the hypothesis and evidence scoring stage 350 logic to eliminate candidate answers (hypothesis) from consideration, adjust weights or other factors used to generate confidence scores for the various candidate answers, or otherwise adjust the confidence scoring of the various candidate answers to favor those candidate answers corresponding to the implied context clarified by the user input and/or decrease the favorability of candidate answers that do not correspond to the implied context clarified by the user input. That is, confidence scores associated with candidate answers having differentiating factors whose content is "United States" may be more heavily weighted in response to the user submitting user input indicating that the user intended the input question 310 "Who was the first president?" to refer to the first president of the United States. Confidence scores associated with other candidate answers may be left the same or have their weights reduced relatively so as to decrease their ranking within the candidate answers returned by the QA system pipeline 300. Alternatively, candidate answers that do not have differentiating factors whose content is "United States" may be eliminated from the list of candidate answers undergoing synthesis in the synthesis stage 360.

As a result, the candidate answers that are considered during the final confidence merging and ranking stage 370 and final answer and confidence stage 380 are modified from those originally generated by the hypothesis generation stage 340. The modified set of candidate answers are modified according to the clarification of the implied context of the input question 310 made by the user in response to the identification of differentiating factors between candidate answers in evidence passages supporting the various candidate answers. Thus, the mechanisms of the illustrative embodiments provide the ability to clarify the context of an input question to thereby improve the answers generated by the QA system pipeline 300.

Many modifications and additions may be made to the embodiments described above without departing from the spirit and scope of the illustrative embodiments. In one illustrative embodiment, a matrix may be generated with entries corresponding to the various extracted features of the evidence passages that are indicative of differentiating factors. Counts may be associated with each entry in the matrix to identify how many evidence passages contain the corresponding differentiating factor. For example, there may be an entry in the matrix for "United States" and another entry for "Southern Baptist Convention." If 4 different evidence passages contain the extracted feature of "United States" then a corresponding count for the entry in the matrix may be set to a value of 4. Similarly, if 2 different evidence passages contain the extracted feature of "Southern Baptist Convention," then a corresponding count for the entry in the matrix may be set to a value of 2.

The counts for each of the entries may be used to identify which differentiating factors are most likely to clarify the input question 310 such that a final clarification of the input question 310 for identifying a final answer is reached in a fastest possible manner. For example, the differentiating factors of a particular type of extracted feature that have equal to or above a predetermined threshold count number may be selected for use in generating the user interface clarification questions. Alternatively, a predetermined top number of differentiating factors, e.g., the top 2 differentiating factors, of a particular type of extracted feature may be selected for use in generating the user interface clarification question. Various selection criteria may be used based on the matrix of entries and corresponding counts to thereby select the differentiating factors that are most likely to clarify the implied context of the input question 310 and result in a rapid identification of a correct answer for the input question 310.

Figure 4A:
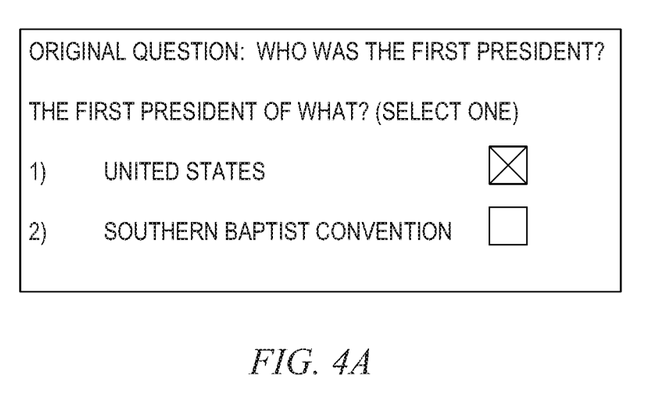
FIGS. 4A-4C illustrate examples of user interfaces and clarification questions that may be generated in accordance with illustrative embodiments of the present invention.
Figure 4B:
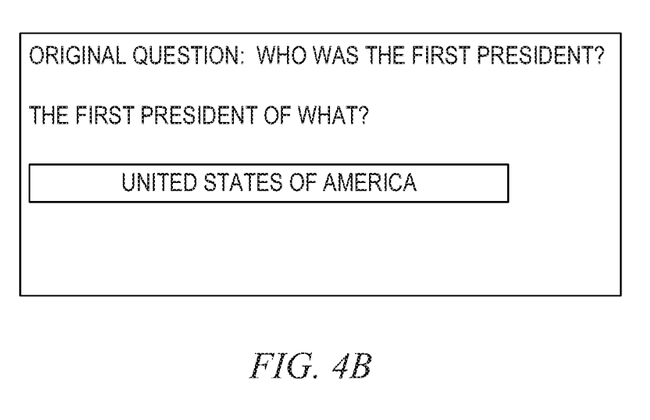
Figure 4C:
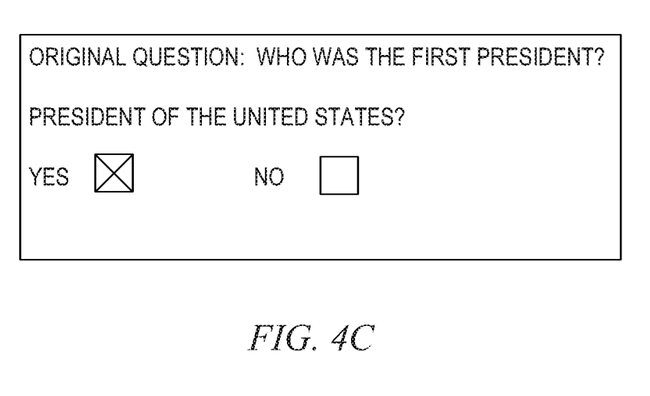

As discussed above, based on the identification of differentiating factors in the evidence passages, one or more user interfaces having one or more clarification questions may be generated and output to a user via their computing device to thereby solicit user input to clarify the implied context of the input question. FIGS. 4A-4C illustrate examples of user interfaces and clarification questions that may be generated in accordance with illustrative embodiments of the present invention. FIG. 4A illustrates an example of a user interface in which a clarification question is presented in a multiple-choice answer format. With this example, the clarification question is presented and a listing of potential answers to the clarification question is also presented along with user selectable fields for identify which of the potential answers the user believes to be indicative of the implied context of the original input question. An potential answer of "none of the above" may also be presented in the case that the user believes none of the other potential answers are indicative of the implied context. If this is the case, a second user interface may be generated with another clarification question using other differentiating factors may be presented or a user interface indicating that clarification cannot be identified and that the input question cannot be answered with certainty may be presented.

FIG. 4B shows another example user interface in which the clarification question is presented in a format in which the user may enter the answer to the clarification question via a free-form field. Because the user may enter any text that they believe appropriate to answer the clarification question. Further analysis of the user's input may be required by the elements 392-396 to compare the user's input to differentiating factors to thereby identify which evidence passages correspond to the user's input and which of their corresponding candidate answers are likely the correct answer to the input question based on the clarified implied context of the input question.

FIG. 4C illustrates another example user interface in which the clarification question is presented in a format of a yes/no question. In this case, the differentiating factor, e.g., "United States," is presented as part of the clarification question with the answer to the input question being either "Yes" or "No." If the user selects the "Yes" answer, then the corresponding differentiating factor is identified as clarifying the implied context of the input question. If the "No" answer is selected, further user interface(s) and/or clarification questions with other differentiating factors may be presented in the yes/no format until a "Yes" answer is returned or there are no other differentiating factors available to generate clarification questions. If there are no further differentiating factors available to generate clarification questions and a "Yes" answer has not been returned, then a user interface may be presented that indicates that the input question could not be answered with sufficient confidence.

Figure 5:
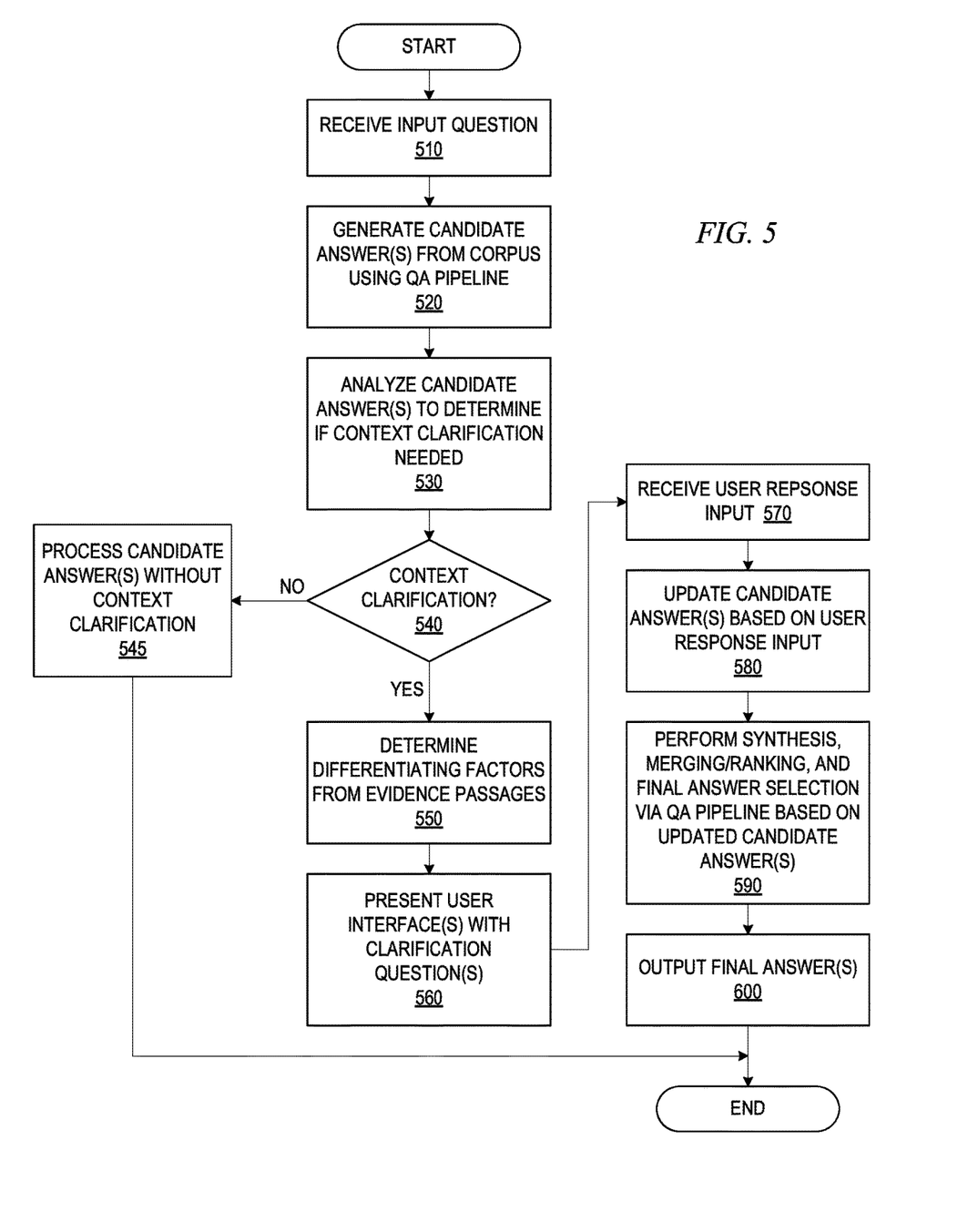
FIG. 5 is a flowchart outlining an example operation for clarifying the implied context of an input question in accordance with one illustrative embodiment.

FIG. 5 is a flowchart outlining an example operation for clarifying the implied context of an input question in accordance with one illustrative embodiment. As shown in FIG. 5, the operation starts by receiving an input question (step 510). Candidate answers are generated from a corpus of information using a QA system pipeline (step 520). The candidate answers are analyzed to determine if the implied context of the input question needs to be clarified (step 530).

A determination if made as to whether clarification of the implied context of the input question is needed (step 540). As described above, this determination may be made based on whether there are multiple potentially "correct" candidate answers for the input question or not. If clarification is not needed, then the candidate answers are processed by the QA system pipeline without further clarification of the implied context of the input question (step 545). The operation then continue to step 600 where a final answer and/or ranked listing of candidate answers is generated and output to the submitted of the input question followed by termination of the operation.

If clarification is determined to be needed, then the differentiating factors between the evidence passages for candidate answers are identified (step 550). As mentioned above, in some illustrative embodiments, this may involve the generation of a matrix of differentiating factors and corresponding counts which may be used to select which differentiating factors are most likely to clarify the implied context of the input question.

Based on the identification of the differentiating factors, one or more user interfaces having one or more clarification questions are generated and output to a submitter of the input question (step 560). The user response input to the user interface(s) is then received from the submitter (step 570) and the candidate answers are updated based on the user response input (step 580). As discussed above, this may involve eliminating some candidate answers from further consideration, changing weights applied to confidence scores, or components of confidence scores, or the like. Synthesis, merging/ranking, and final answer selection via the QA system pipeline are then performed based on the modified candidate answers (step 590). The final answer and/or ranked listing of candidate answers may then be generated and output to the submitter of the input question (step 600). The operation then terminates.

Thus, the illustrative embodiments provide mechanisms for clarifying the implied context in an originally submitted input question. The illustrative embodiments cause the QA system to generate more accurate answers for input questions when multiple potentially correct answers are determined to be present in a set of originally generated candidate answers. Through user collaboration, based on automatically identified differentiating factors in evidence passages supporting the various potentially correct answers, the implied context of the originally input question may be ascertained and used to select the candidate answer(s) that are most likely the correct answer for the input question and correspond to the implied context of the originally input question.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for clarifying an input question, the method comprising:
    generating, in the data processing system, a set of candidate answers for an input question, wherein each candidate answer in the set of candidate answers corresponds to an evidence passage supporting the candidate answer as answering the input question;
    determining, in the data processing system, based on the set of candidate answers, whether clarification of the input question is required; and
    in response to a determination that clarification of the input question is required:
        identifying, by the data processing system, a differentiating factor in evidence passage of at least two candidate answers in the set of candidate answers;
        outputting, by the data processing system, a request for user input to clarify the input question, wherein the request for user input is generated based on the identified differentiating factor; and
        selecting, by the data processing system, at least one candidate answer in the set of candidate answers as an answer for the input question based on a user input in response to the request.

2. The method of claim 1, wherein the request for user input comprises a clarification question directed to the differentiating factor and a plurality of user selectable potential answers to the clarification question, each answer corresponding to a portion of a corresponding one of the evidence passages, of the at least two candidate answers, directed to the differentiating factor.

3. The method of claim 1, wherein the request for user input comprises a clarification question that comprises a potential answer corresponding to the differentiating factor in the content of the clarification question and user selectable potential answers in the affirmative and negative for answering the clarification question.

4. The method of claim 1, wherein the request for user input comprises a clarification question that is directed to the differentiating factor and a free-form text entry field into which a user may input a textual answer to the clarification question.

5. The method of claim 1, wherein determining, based on the set of candidate answers, whether clarification of the input question is required comprises determining that clarification of the input question is required in response to the set of candidate answers comprising a plurality of candidate answers with corresponding confidence scores equal to or higher than a predetermined threshold confidence score.

6. The method of claim 1, wherein selecting at least one candidate answer in the set of candidate answers as an answer for the input question comprises:
    updating the set of candidate answers based on the user input; and
    selecting the at least one candidate answer from the updated set of candidate answers.

7. The method of claim 6, wherein updating the set of candidate answers comprises modifying confidence scores associated with one or more of the candidate answers in the set of candidate answers based on the user input, wherein confidence scores for candidate answers having evidence passages corresponding to the user input are increased and candidate answers having evidence passages not corresponding to the user input are decreased.

8. The method of claim 6, wherein updating the set of candidate answers comprises removing candidate answers, from the set of candidate answers, that have evidence passages that do not correspond to the user input.

9. The method of claim 6, wherein selecting the at least one candidate answer from the updated set of candidate answers comprises:
    performing synthesis stage, merging and ranking stage, and final answer selecting stage operations of a question and answer (QA) system pipeline on the updated set of candidate answers.

10. The method of claim 1, wherein the request comprises a clarifying question posed to a user, wherein the clarifying question is generated based on the differentiating factor and is constructed such that an answer to the clarifying question indicates a correctness of one of the at least two candidate answers based on their associated evidence passages.

11. A computer program product comprising a computer readable storage medium having a computer readable program stored therein, wherein the computer readable program, when executed on a computing device, causes the computing device to:

generate a set of candidate answers for an input question, wherein each candidate answer in the set of candidate answers corresponds to an evidence passage supporting the candidate answer as answering the input question;

determine, based on the set of candidate answers, whether clarification of the input question is required; and in response to a determination that clarification of the input question is required:

identify a differentiation factor in evidence passages of at least two candidate answers in the set of candidate answers;

output a request for user input to clarify the input question, wherein the request for user input is generated based on the identified differentiating factor; and select at least one candidate answer in the set of candidate answers as an answer for the input question based on a user response to the request.

12. The computer program product of claim 11, wherein the request for user input comprises a clarification question directed to the differentiating factor and a plurality of user selectable potential answers to the clarification question, each answer corresponding to a portion of a corresponding one of the evidence passages, of the at least two candidate answers, directed to the differentiating factor.

13. The computer program product of claim 11, wherein the request for user input comprises a clarification question that comprises a potential answer corresponding to the differentiating factor in the content of the clarification question and user selectable potential answers in the affirmative and negative for answering the clarification question.

14. The computer program product of claim 11, wherein the request for user input comprises a clarification question that is directed to the differentiating factor and a free-form text entry field into which a user may input a textual answer to the clarification question.

15. The computer program product of claim 11, wherein determining, based on the set of candidate answers, whether clarification of the input question is required comprises determining that clarification of the input question is required in response to the set of candidate answers comprising a plurality of candidate answers with corresponding confidence scores equal to or higher than a predetermined threshold confidence score.

16. The computer program product of claim 11, wherein the computer readable program further causes the computing device to select at least one candidate answer in the set of candidate answers as an answer for the input question at least by:

updating the set of candidate answers based on the user input; and selecting the at least one candidate answer from the updated set of candidate answers.

17. The computer program product of claim 16, wherein the computer readable program further causes the computing device to update the set of candidate answers at least by modifying confidence scores associated with one or more of the candidate answers in the set of candidate answers based on the user input, wherein confidence scores for candidate answers having evidence passages corresponding to the user input are increased and candidate answers having evidence passages not corresponding to the user input are decreased.

18. The computer program product of claim 16, wherein the computer readable program further causes the computing device to update the set of candidate answers at least by removing candidate answers, from the set of candidate answers, that have evidence passages that do not correspond to the user input.

19. The computer program product of claim 11, wherein the request comprises a clarifying question posed to a user, wherein the clarifying question is generated based on the differentiating factor and is constructed such that an answer to the clarifying question indicates a correctness of one of the at least two candidate answers based on their associated evidence passages.

20. An apparatus comprising:

a processor; and a memory coupled to the processor, wherein the memory comprises instructions which, when executed by the processor, cause the processor to:

generate a set of candidate answers for an input question, wherein each candidate answer in the set of candidate answers corresponds to an evidence passage supporting the candidate answer as answering the input question;

determine, based on the set of candidate answers, whether clarification of the input question is required; and in response to a determination that clarification of the input question is required:

identify a differentiation factor in evidence passages of at least two candidate answers in the set of candidate answers;

output a request for user input to clarify the input question, wherein the request for user input is generated based on the identified differentiating factor; and select at least one candidate answer in the set of candidate answers as an answer for the input question based on a user response to the request.

* * * * *